United States Patent [19]
Takabatake et al.

[11] 3,927,223
[45] Dec. 16, 1975

[54] METHOD OF FORMING REFRACTORY OXIDE COATINGS

[75] Inventors: Mitsuo Takabatake, Tokyo; Kikuo Tsuji, Yokohama, both of Japan

[73] Assignee: Asahi Glass Company, Ltd., Tokyo, Japan

[22] Filed: May 10, 1973

[21] Appl. No.: 358,867

[30] Foreign Application Priority Data
May 11, 1972 Japan.................................. 47-45840

[52] U.S. Cl.................. 427/34; 266/34 L; 427/229; 427/405; 427/419
[51] Int. Cl.$^2$........................ B05B 7/22; B05D 1/08
[58] Field of Search......... 117/93.1 PF, 70 A, 70 C, 117/71 M, 94, 105.2; 266/34 L

[56] References Cited
UNITED STATES PATENTS

| | | |
|---|---|---|
| 2,707,691 | 5/1955 | Wheildon............................ 117/129 |
| 3,006,782 | 10/1961 | Wheildon........................... 117/71 M |
| 3,050,409 | 8/1962 | Bayer.................................. 117/70 A |
| 3,617,358 | 11/1971 | Dittrich........................... 117/93.1 PF |
| 3,736,109 | 5/1973 | Darling et al. ................ 117/93.1 PF |

*Primary Examiner*—J. H. Newsome
*Attorney, Agent, or Firm*—Oblon, Fisher, Spivak, McClelland & Maier

[57] ABSTRACT

A coating of a basic refractory metal oxide powder of $MgO—MgO.Al_2O_3$, $MgO—MgO.(Al,Cr)_2O_3$, $MgO—MgO(Al,Fe)_2O_3$, or $MgO—MgO.(Al,Cr,Fe)_2O_3$ is applied by a plasma flame spraying technique to a substrate. The basic refractory metal oxide coating is preferably formed over an undercoat covering said substrate.

13 Claims, No Drawings

METHOD OF FORMING REFRACTORY OXIDE COATINGS

BACKGROUND OF THE INVENTION

1. Field of the Invention

This invention relates to a method of forming a refractory oxide coated membrane. More particularly, it relates to a refractory basic oxide coated membrane.

2. Description of the Prior Art

Recently, many procedures have been used to form a ceramic coated membrane on a substrate, especially on metal substrates in order to improve the heat resistance and corrosion resistance of the substrate. In the processes of forming ceramic coated membranes, various conventional ceramic coating methods have been used depending upon the purpose and use of the eventual product. These methods have included the method of sintering a glaze containing a refractory oxide powder, the method of flame-spraying a ceramic powder by a plasma jet flame or an oxygen-acetylene flame; and the method of high temperature vacuum evaporation. However, the membranes produced by these conventional methods have been very limited in the thickness of the coated membranes and in the adhesive strength of the coated membranes to the substrates.

On the other hand, when a substrate such as a converter lance nozzle is coated by dipping it in high temperature basic slag it is necessary that the substrate have not only corrosion resistance to the basic slag, but also heat resistance and thermal shock resistance. Neutral and acidic oxides such as $Al_2O_3$, $ZrO_2$, and the like are easily corroded by basic slags, and it has been well known in the refractory metal oxide field, that MgO, $Mg-Al_2O_3$, or the like usually have high corrosion resistance to basic slags.

A need, therefore, exists for materials such as MgO or $MgO-Al_2O_3$ which can be used as refractory metal oxide coatings. Because refractory metal oxide powders have high melting points, it has been necessary to apply the coatings by use of a plasma flame spraying method. Under these conditions MgO has been difficult to use by plasma flame spraying techniques as a powder because MgO is easily vaporized at high temperatures.

SUMMARY OF THE INVENTION

Accordingly, one object of this invention is to provide a method of forming basic refractory coated membranes rich in MgO on a substrate.

Another object of this invention is to provide a method of forming refractory oxide coated membranes rich in MgO, which have high adhesive strength to substrates.

Yet another object of this invention is to provide a method of forming refractory oxide coated membranes rich in MgO on a substrate, which have high thermal shock resistance.

Still another object of this invention is to provide a method of forming refractory oxide coated membranes rich in MgO on a substrate, which have high heat resistance and corrosion resistance.

Briefly, these objects and other objects of this invention as hereinafter will become readily apparent can be attained by providing a method of forming a refractory oxide coated membrane on a substrate by applying a $MgO-MgO.Al_2O_3$ refractory metal oxide such as $MgO-MgO.Al_2O_3$, $MgO-MgO.(Al, Cr)_2O_3$, $MgO-MgO.(Al, Fe)_2O_3$ or $MgO-MgO.(Al, Cr, Fe)_2O_3$ on said substrate by a flame-spraying technique and depositing said refractory metal oxide on said substrate as a coated membrane.

DETAILED DESCRIPTION OF THE PREFERRED EMBODIMENTS

In the method of this invention, the plasma flame spraying method is preferably employed as the method of application of the refractory oxide coating. In the method, coated membranes of the $MgO-MgO.Al_2O_3$ refractory oxide can be directly or indirectly formed on the substrate. In general, if the substrate is a ceramic material, the coated membrane is directly formed on the substrate. On the other hand, if the substrate is a metal, refractory coated membrane is formed over an intermediate undercoat on the substrate. In the latter case, the undercoat can be formed by flame spraying a Ni—Al or Ni—Cr alloy powder which is sold as an undercoating agent.

In the investigations leading to the present invention it has been found that optimum undercoats having high adhesive strength and high thermal shock resistance can be prepared by a thermite process. The undercoat prepared by the thermite process, is now illustrated in detail. If metal is used as the substrate, it is preferable to use as an undercoat the combination of at least one oxide such as NiO, CuO, ZnO, $Cr_2O_3$, $Fe_2O_3$, or the like which are more difficultly oxidized than $Al_2O_3$, and at least one of Al and Al alloys.

The undercoat can be prepared by coating the appropriate materials separately or as a mixture, on the substrate and then heating the material by a plasma flame, or by coating the materials on the metal substrate by plasma flame spraying and if necessary, further heating the coated material with a flame. When the thermite process is used, the following exothermic reaction ensures, which results in an undercoat that is formed by firmly bonding the resulting oxide containing layer to the metal substrate $$M_1 \text{ oxide} + M_2 \rightarrow M_1 + M_2 \text{ oxide}$$

wherein $M_1$ represents a metal which is less easily oxidized than $M_2$ represents Al, an Al alloy, Cr or a Cr alloy.

The thickness of the undercoat usually ranges from $10-200\mu$, especially $30-100\mu$. In accordance with the process of this invention, the $MgO-MgO.Al_2O_3$ coated membrane is formed on the substrate or the undercoated substrate. The $MgO-MgO.Al_2O_3$ coated membrane can be formed by using $MgO-MgO.Al_2O_3$ oxide powders (hereinafter referred to as PS powder) and will be illustrated in detail.

The PS powder comprises periclase (MgO) and spinel ($MgO.Al_2O_3$) crystals, and is prepared by melting a mixture of MgO and a desirable oxide raw materials, cooling the mixture, resolidifying the mixture and then crushing the product. Suitable PS powder compositions comprise 5–30% periclase and 95–70% spinel crystals, and if necessary, less than 10% glassy components. (Hereinafter, the term percent means percent by weight). If the PS powder is sprayed on a substrate by a plasma flame, it is firmly bonded to the substrate by the binding function of the spinel component which maintains a large amount of MgO component in the composition. It has been found that the PS power imparts greater adhesive amounts of MgO, greater coating quantities of powder and higher densities to the coated membranes when the PS powder has a portion of its $MgO.Al_2O_3$ component substituted with $Cr_2O_3$ or $Fe_2O_3$. This effect is most substantial when 1/5–4/5, especially 1/3–2/3 of the $Al_2O_3$ is substituted in the PS powder with $Cr_2O_3$ or $Fe_2O_3$. The adhesive amounts of MgO are increased by the binding function of the spinel components as stated above. If $Al_2O_3$ and $Cr_2O_3$ are present in the spinel component, the adhesive strength of the coated membrane further increases, and the air-permeability and the number of pin-holes decreases as a fine dense membrane is formed.

The type of membrane has a high thermal expansion so that when it is coated on iron, copper, stainless-steel or the like, the spalling resistance of the product is improved because the difference in the thermal expansion between the metal and the membrane is small.

$Fe_2O_3$ substituted products have similar advantages. However, when the quantities of $Fe_2O_3$ substituted in the powder surpass the stated limitations the advantageous characteristics of the composition of the invention are lacking. In order to decrease the air-permeability of the membrane, it is possible to combine less than 10% silicate glass with the PS powder.

Table I lists the analytical data obtained for certain typical examples of the PS powder.

TABLE I

| PS Powder | MgO | $Al_2O_3$ | $Cr_2O_3$ | $Fe_2O_3$ | $SiO_2$ |
|---|---|---|---|---|---|
| $MgO-MgO.Al_2O_3$ | 40–75 | 60–25 | — | — | (1–10) |
| $MgO-MgO.(Al, Cr)_2O_3$ | 40–75 | 15–45 | 10–45 | — | (1–10) |
| $MgO-MgO(Al, Fe)_2O_3$ | 40–75 | 15–45 | — | 10–45 | (1–10) |
| $MgO-MgO(Al, Cr, Fe)_2O_3$ | 40–75 | 5–25 | 5–25 | 5–25 | (1–10) |

These PS powders are usually used in the form of a particle size less than 200 mesh (Tyler), preferably less than 325 mesh (Tyler).

The coated membrane formed by flame-spraying the PS powder, usually has a thickness of 0.05–0.6 mm, but preferably, a thickness greater than 1 mm.

In accordance with the procedure of this invention, a dense MgO rich coated membrane can be formed on a substrate in order that the corrosion resistance of the substrate can be improved. The difference in the thermal expansion between the coated membrane and the substrate is small so that the membrane has a high thermal shock resistance and a high adhesive strength to the substrate.

the coating of $MgO—MgO.Al_2O_3$ and further, the overcoatings impart improved thermal shock resistance to the coated membrane. These coated products have a wide range of applicability depending upon the use intended.

Incidentally, the $MgO—MgO.Al_2O_3$ oxide coat can be formed by flame-spraying a refractory oxide powder of $MgO—MgO.Al_2O_3$ oxide. It is also possible to add other types of refractory powders to the $MgO—MgO.Al_2O_3$ oxide powder.

Having generally described this invention, a further understanding can be obtained by reference to certain specific examples which are provided herein for purpose of illustration only and are not intended to be limiting unless otherwise specified.

EXAMPLE I

The oxides and metal powders shown in Table II were plasma-flame-sprayed onto a stainless steel substrate, under the conditions stated in the notes, so as to form an undercoat a, b or c having a thickness of 30–100μ.

TABLE II

| Undercoat | Coating Material Oxide (200–400 mesh) | | Metal(100–200 mesh) | |
|---|---|---|---|---|
| a | NiO | 30% | Al | 70% |
| b | NiO | 30% | Al-Ni alloy | 70% |
| c | $Cr_2O_3$ | 30% | Al-Ni alloy | 70% |

Note 1 The oxides and metals were coated by a plasma flame spraying method under the conditions of an electric current of 400A, an $N_2$ feed rate of 120 ft³/hr, and a $H_2$ feed rate of 15 ft³/hr.

The refractory powders shown in Table III were coated on the undercoated stainless steel by the plasma flame spraying method (Note 1) under the conditions shown in Table III to form a refractory oxide coat A, B, C, D or S.

TABLE III

| | Refractory Coat | | Analytical data of refractory powder (Note 2) | | | | | |
|---|---|---|---|---|---|---|---|---|
| | Crystalline-phase | thickness (μ) | MgO | $Al_2O_3$ | $Cr_2O_3$ | $Fe_2O_3$ | $SiO_2$ | other |
| A | $MgO-MgO.Al_2O_3$ | 200–400 | 42–44 | 56–58 | — | — | 0–2 | 0–2 |
| B | $MgO-MgO.(Al, Cr)_2O_3$ | 200–400 | 42–44 | 22–24 | 32–34 | — | 0–4 | 0–2 |
| C | $MgO-MgO.(Al, Fe)_2O_3$ | 200–400 | 42–44 | 24–26 | — | 30–32 | 0–4 | 0–2 |
| D | $MgO-MgO(Al,Cr,Fe)_2O_3$ | 200–400 | 53–56 | 15–18 | 15–18 | 8–11 | 0–4 | 1–4 |
| E | $MgO.Al_2O_3$ (Note 3) | 200–400 | 27–29 | 73–71 | — | — | 0– | 0–2 |

Note 2 The raw materials were melted in an electric furnace and cooled to resolidify the product. The product was crushed to a particle size less than 270 mesh (Tyler).
Note 3 MgO and $Al_2O_3$ were mixed in an equimolar ratio and the mixture was molded and sintered to form a spinel having a particle size less than 270 mesh (Tyler).

It is possible to form a corrosion resistant oxide coated membrane such as $Al_2O_5$, $ZrO_2$ over the refractory metal oxide coat of this invention. The coatings of $Al_2O_3.ZrO_2$ and the like are not adversely affected by The properties of the resulting products coated with an undercoat and a refractory oxide coat are shown in Table IV.

TABLE IV

| Under coat | a or b | b | a or c | a or b |
|---|---|---|---|---|
| Over coat | A | B or C | D | S |
| Overcoat material (coated amount of PS powder) (wt%) | 20 – 30 | 30 – 40 | 30 – 40 | 20 – 30 |
| Thermal expansion ($\times 10^{-6}$) | 10.2 – 10.5 | 9.8 – 9.9 | 9.8 – 9.9 | 9.0 |
| Gas permeability ($cm^2/cm\ H_2O$ sec.) | | 1.8 – 2.0 $\times 10^{-5}$ | 1.8 – 2.0 $\times 10^{-5}$ | |
| Apparent Specific gravity | 3.57 – 3.59 | 3.56 – 3.59 | 3.56 – 3.59 | 3.56 – 3.6 |
| Bulk Specific Gravity | 3.10 – 3.12 | 3.26 – 3.3 | 3.26 – 3.3 | 3.06 – 3.09 |
| Apparent Porosity (%) | 13.0 – 13.5 | 8.0 – 9.0 | 8.2 – 9.0 | 13.5 – 13.8 |
| Adhesive Strength ($kg/cm^2$) | >170 | >220 | >220 | <160 |
| Periclase (wt%) (amount of PS powder before coating) | 30 – 35 | 30 – 35 | 30 – 35 | 0 |
| Periclase (wt%) (amount after coating) | 10 – 15 | 20 – 22 | 20 – 22 | 0 |
| Thermal shock resistance (Note 4) (turns) (1200°C) | 4 – 5 | 8 – 9 | 8 – 9 | 2 |

Note 4 The coating material was coated on a 15 mm iron plate having a diameter of 30 mm and the product was kept in a furnace at 1200°C for 30 minutes. The resulting product was cooled to room temperature by a fan and the operation was repeated until the coated membrane peeled.

EXAMPLE 2

In accordance with the procedure of Example 1, the undercoat and the refractory coat D were formed on the substrate. A powder of $Al_2O_3$ or $ZrO_3$ less than 270 mesh was coated on the coated substrate by the plasma flame spraying method under the conditions of Note 4, to form an overcoat of $Al_2O_3$ or $ZrO_2$. The thickness of the overcoat of $Al_2O_3$ or $ZrO_2$ was in the range of 100–200$\mu$. The results of the adhesive strength and the thermal shock tests of the resulting overcoat are shown in Table V.

TABLE V

| Overcoat | Adhesive strength ($kg/cm^2$) | | Thermal shock (Turns) | |
|---|---|---|---|---|
| | Tensile strength | Shearing strength | 1000°C | 1200°C |
| $Al_2O_3$ | 130–150 | 220–250 | >10 | 3–4 |
| $ZrO_2$ | 110–120 | 170–190 | >10 | 4–5 |

Having now fully described this invention, it will be apparent to one of ordinary skill in the art that many changes and modifications can be made thereto without departing from the spirit or scope of the invention as set forth herein

What is claimed as new and desired to be secured by Letters Patent of the U.S. is:

1. A method of forming a refractory metal oxide coat on a substrate, which comprises:
applying a MgO—MgO.$Al_2O_3$ refractory metal oxide containing 5–30% periclase and 95–75% spinel oxide by a flame spraying technique to the surface of said substrate thereby depositing said refractory metal oxide on a surface of said substrate as a coated membrane.

2. The method according to claim 1 wherein said refractory metal oxide is selected from the group consisting of MgO—MgO.$Al_2O_3$, MgO—MgO.(Al, Cr)$_2O_3$, MgO—MgO.(Al, Fe)$_2O_3$, and MgO—MgO.(Al, Cr, Fe)$_2O_3$.

3. The method according to claim 1, wherein said refractory metal oxide is formed by fusing and resolidifying a mixture of materials which form said refractory metal oxide.

4. The method according to claim 1, wherein said refractory metal oxide is a fine powder having a particle size less than 200 mesh (Tyler).

5. The method according to claim 1, wherein said refractory metal oxide coating ranges from about 0.05–1.0 mm thick.

6. The method according to claim 2, wherein said refractory metal oxide consists essentially of from 40 to 75% MgO, from 5–60% $Al_2O_3$, from 0–45% $Cr_2O_3$, from 0–45% $Fe_2O_3$ and from 0–10% $SiO_2$.

7. The method according to claim 1, wherein said substrate is a metal and an undercoating is applied to said substrate prior to the application of said refractory metal oxide coating.

8. The method according to claim 7, wherein said refractory metal oxide coating is applied over the undercoat on said metal substrate by a plasma flame spraying technique.

9. The method according to claim 8, wherein said undercoat is formed on said substrate by a thermite process.

10. A method of forming a refractory metal oxide coating on a substrate which comprises forming an undercoat on said substrate by a thermite process, applying a refractory metal oxide of a MgO—MgO.$Al_2O_3$ composition on said undercoat by a plasma flame spraying technique thereby depositing said refractory metal oxide as an intermediate coating over said undercoat and forming an overcoat of $Al_2O_3$ or $ZrO_2$ upon said refractory metal oxide coating by a plasma flame spraying technique.

11. The method according to claim 2, wherein said refractory metal oxide consists essentially of from 40–75% MgO, from 60–25% $Al_2O_3$ and from 0–10% $SiO_2$.

12. The method according to claim 2, wherein said refractory metal oxide consists essentially of from 40–75% MgO, from 15–45% $Al_2O_3$, from 15–45% $Cr_2O_3$ or $Fe_2O_3$ and from 0–10% $SiO_2$.

13. The method according to claim 2, wherein said refractory metal oxide consists essentially of from 40–75% MgO, from 5–25% $Al_2O_3$, from 5–25% $Cr_2O_3$, from 5–25% $Fe_2O_3$ and from 0–10% $SiO_2$.

* * * * *